United States Patent [19]

Kamimura et al.

[11] 3,721,138
[45] March 20, 1973

[54] DEVICE FOR CUTTING AN OUTER LAYER OF THE CONCENTRIC MULTILAYER ROD-LIKE STRUCTURE

[75] Inventors: Masato Kamimura; Saburo Fukui, both of Tokyo, Japan

[73] Assignee: Nippon Electric Company, Limited, Tokyo, Japan

[22] Filed: Sept. 3, 1970

[21] Appl. No.: 69,287

[30] Foreign Application Priority Data

Sept. 4, 1969   Japan..................................44/70444

[52] U.S. Cl..................................................81/9.51
[51] Int. Cl................................................H02g 1/12
[58] Field of Search.................81/9.51, 9.5 R, 9.5 A

[56] References Cited

UNITED STATES PATENTS 2,376,858   5/1945   Barrans et al...................81/9.51 UX
3,153,358   10/1964  Havens..............................81/9.51
3,171,306   3/1965   Mirsch...............................81/9.51

FOREIGN PATENTS OR APPLICATIONS 126,534   5/1959   U.S.S.R................................81/9.51

Primary Examiner—Robert C. Riordon
Assistant Examiner—Roscoe V. Parker, Jr.
Attorney—Ostrolenk, Faber, Gerb & Soffen

[57] ABSTRACT

Apparatus for stripping a selected length of sheathing from a coaxial cable and the like. A die is positioned about the coaxial cable and a hollow cylindrical-shaped die is inserted beneath the sheathing to a depth commensurate with the amount to be stripped, accurate adjustment being controlled by an interior mounted slidable scale member. The two die members are brought into abrupt engagement with one another by being moved either linearly and/or rotationally relative to one another whereby the selected length of sheathing is stripped therefrom.

2 Claims, 7 Drawing Figures

PATENTED MAR 20 1973 3,721,138
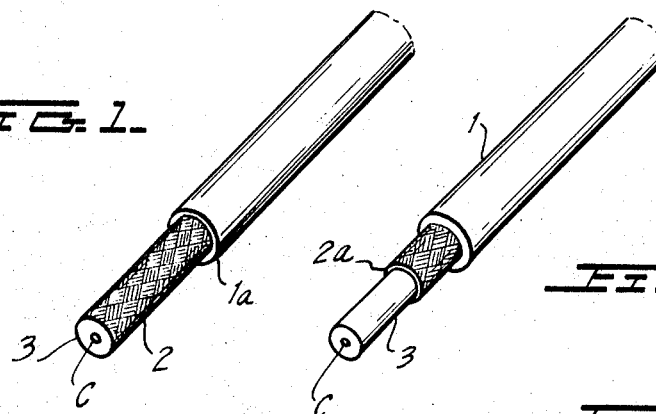
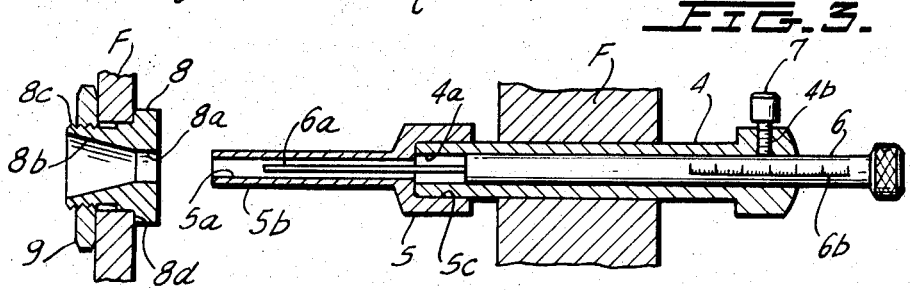
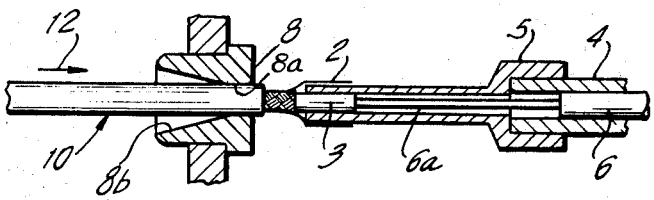
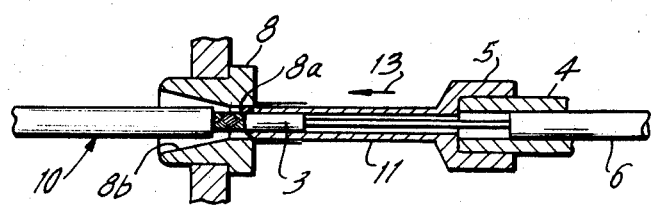
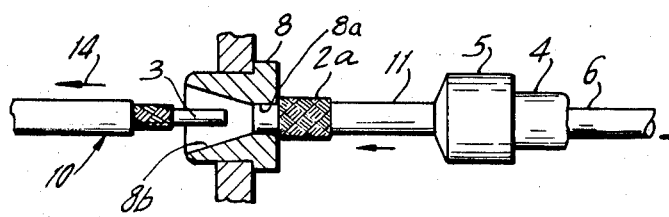
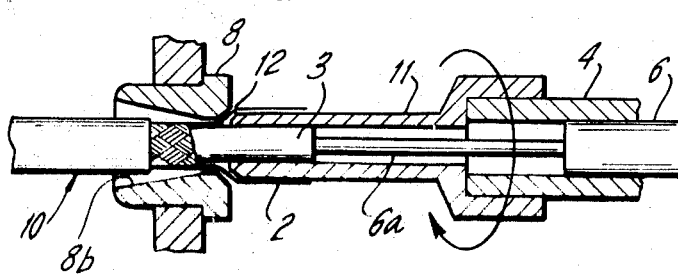
INVENTORS
MASATO KAMIMURA
BY SABURO FUKUI
Ostrolenk, Faber, Gerb & Soffen
ATTORNEYS

DEVICE FOR CUTTING AN OUTER LAYER OF THE CONCENTRIC MULTILAYER ROD-LIKE STRUCTURE

The present invention relates to cable and the like and more particularly to cable of the coaxial type including a sheath or layer of shielding cable and apparatus for removing selected end portions therefrom.

Cables of the type typically employed in the electrical and electronic fields normally have its sheathing stripped by selected amounts to provide for electrical connection between a conductor and associated electrical or electronic circuitry. One type of cable, typically referred to as coaxial cable, is comprised of a conductive cord surrounded by an insulating sleeve which, in turn, is surrounded by a metallic sheathing which ultimately is contained within an outermost insulating layer. In order that connection be made to electrical circuitry, it is typical to strip away the outermost insulating layer to a maximum amount and to strip away the conductive shielding and inner insulating layer to graduated lesser amounts so as to expose the conductive sheathing and conductive cord by predetermined amounts and thereby enable a rather simple, straightforward electrical connection thereto. Initially the outermost insulating layer is first stripped away exposing the conductive sheathing or knitted layer, a portion of which must also be stripped away. The stripping operation is typically performed manually with a pair of scissors or tool, such as, for example, a stripper. It has been experienced that such tools have shown that the stripping operation is highly inefficient from the viewpoint of performance and that the result of the stripping operation manifests itself in an uneven and in fact an unsatisfactory condition. In addition thereto, cutting of the conductive sheathing is made more difficult when the thickness thereof is rather substantial.

The present invention is characterized by providing an apparatus for stripping conductive sheathing in a neat, effective and simple manner regardless of sheath thickness.

The present invention is comprised of a punch and corresponding die member which are arranged to engage the outer and inner faces, respectively, of a conductive sheathing layer and to efficiently cut the desired length therefrom through their cooperative action which may be relative linear and/or rotational movement. Adjustable means are provided for automatically regulating the amount of sheathing to be cut away through positioning of the inner conductive core and inner insulating layer in abutting relationship with the adjustable means to thereby further simplify performance of the operation.

It is therefore one primary object of the present invention to provide a simplified reliable apparatus for cutting a selected length of sheathing from a coaxial cable.

Another object of the present invention is to provide a simplified reliable apparatus for cutting a selected length of sheathing from a coaxial cable and whereby further adjustable means are provided for defining insertion depths of the punch into the cord thereby automatically regulating the length of cord to be removed.

Another object of the present invention is to provide a novel apparatus for removing selected lengths of sheathing from coaxial cable and the like through the cooperative use of a die and punch in which at least one of said members has a tapered cutting edge to facilitate the cutting operation.

Still another object of the present invention is to provide a simplified reliable apparatus for cutting a selected length of sheathing from a coaxial cable and whereby relative and linear and/or rotational movement between the cutting members is brought into play to effect the cutting operation.

These as well as other objects of the present invention will become apparent from a consideration of the following description and drawings, in which:

FIG. 1 is a perspective view showing the coaxial cable having a portion of its outer insulating sheath stripped away and in which the method and apparatus of the present invention may be used to great advantage for stripping away selected lengths of knitted conductive shield layers.

FIG. 2 is a perspective view showing a coaxial cable of the type shown in FIG. 1 after removal of a selected length of the knitted layer has been effectuated through the method and apparatus of the present invention.

FIG. 3 shows a longitudinal sectional view of a major portion of the embodiment of the present invention incorporating its salient principles.

FIG. 4A–4C are longitudinal sectional views of the cutting device shown in FIG. 3 illustrating the chronological steps employed in performing the cutting operation, wherein FIG. 4A shows the state in which the coaxial cord is first inserted into the cutting device and just before cutting thereof; FIG. 4B shows the state in which the knitted layer is cut; and FIG. 4C shows the state in which the cutaway portion of the knitted layer has been stripped off after the cutting operation.

FIG. 5 is a longitudinal sectional view showing a modified form of the cutting section of the present invention with certain elements being broken away to facilitate an explanation thereof.

FIGS. 1 and 2 show coaxial cable having an outer insulating sleeve or sheath 1 whose left-hand portion has been cut away so that the left-handmost edge is at 1a. This cut away portion exposes a conductive shield knitted layer 2 which lies between outer layer 1 and an inner insulating layer 3 which surrounds a conductive core C. The stripping operation sequence is comprised of the steps of first removing a portion of the outer insulating sleeve 1; removing a portion of the left-hand end of the knitted sleeve 2 and ultimately removing a portion of the inner insulating sleeve 3 so as to expose a sufficient length of the conductive core C to permit electrical connection thereto. FIG. 2 shows the knitted sleeve 2 having a left-hand end portion thereof removed so that its left-handmost edge lies at 2a. Heretofore certain types of scissors or tools such as strippers have been employed for cutting the knitted shield. It has been found that the use of scissors is an inefficient method in that it is difficult to use the scissors as well as to produce a neat final appearance. Cutting also becomes extremely difficult when the thickness of the knitted soft copper wire is substantial. Certain stripper-like tools having plural cutting edges whose outer periphery corresponds to that of the shield knitted layer to be cut, make a deep cut into the knitted layer after which the cut away portion is removed by pulling the coaxial cord in the linear direction. The use of such stripping tools has been found to be unsatisfactory due to the fact that the knitted shield itself is unevenly cut and further due to the fact that the stripper like tool gouges into the insulation layer 3, yielding an unsatisfactory end product. FIG. 3 shows the most important components of the cutting device and method of the present invention which is comprised of a hollow main shaft 4 supported by a machine frame F so as to be freely movable in the axial direction. A punch 5 provided with a wide diameter opening 5c which steps abruptly into a narrow diameter opening 5a, has its wider diameter opening detachably mounted to the left-hand end of shaft 4 in the manner shown. The central openings 4a and 5a of members 4 and 5, respectively, are in alignment with one another so as to permit the passage therethrough of a scale shaft 6 which is freely slidable in the axial direction within central opening 4a. The diameter of opening 5a in punch 5 is substantially equal to the outer diameter of the polyethylene installation layer 3, as shown in FIG. 2, and has a relatively small gauge shell thickness to facilitate insertion of the polyethylene layer 3 into interior 5a while the knitted shield may be slipped over the exterior of punch 5. The dimensional relationships of the Figures have been chosen merely for purposes of facilitating a showing of the apparatus.

The left-hand end of scale shaft 6 is provided with a probe 6a of substantially reduce diameter and which extends into the shaft opening 5a so as to function as a stop to limit the entry of the insulation portion 3 to a selected depth. The insulation 3 is urged into shaft hole 5 to thereby define a predetermined length of the shield knitted layer which is desired to be removed. Graduations may be provided along the length of scale shaft 6 to form a scale portion in the vicinity of its right-hand end, as shown in FIG. 3, in order to accurately adjust the shaft scale to a desired setting determinative of the amount of knitted shield to be removed. The graduations of the scale portion 6b cooperate with the right-hand end of opening 4a in main shaft 4 to establish the appropriate reading. A set screw 7 threadedly engages a tapped opening 4b in main shaft 4 and may be urged against the surface of scale shaft 6 to rigidly maintain the scale shaft in a desired position and thereby prevent movement of the scale shaft relative to main shaft 4 when the cutting operation is in process.

Whereas the thickness of the probe portion 6a provided at the left-hand end of scale shaft 6 is not critical it should be understood that a small diameter probe is preferred so as to accommodate a wider range of punch members 5 whose inner diameters may be significantly smaller than that shown in FIG. 3, thereby enabling the apparatus of FIG. 3 to be employed for use in stripping the knitted shield of coaxial cables having a wide range of diameters. Coaxial cable of different diameters may be so stripped simply by removing the releasably mounted punch 5 and cooperating die 8 (to be more fully described) to accommodate the next coaxial cable to be so stripped.

Once the scale shaft 6 has been appropriately adjusted, the main shaft 4 may be moved by any suitable means in a linear fashion (from right to left) which movement (arrow 13-FIG. 4B) is directly imparted to the punch 5 for a purpose to be more fully described.

Die 8 has its central axis coincident with the central axis of main shaft 4 and punch 5 and is mounted within an opening provided in the machine frame F and likewise aligned with punch 5 as is shown. Die 8 is held in position by means of a tapped binding nut 9 which threadedly engages a threaded portion 8c of die 8. The right-hand portion of the die is provided with a flange 8d which bears against the right-hand surface of the machine frame F and surrounding the opening in Frame F so as to be rigidly held in position. Die 8 may be easily removed and replaced by a die of other dimensions to accommodate the stripping of coaxial cable of commensurate dimensions when desired.

Die 8 is provided with a central opening consisting of a constant diameter portion 8a and a tapered diameter portion 8b of substantially truncated conical shape and integrally extending therefrom. The diameter of the opening portion 8a is dimensioned so as to receive the pointed end 5b of punch 5 with an appropriate clearance therebetween.

FIGS. 4A-4C show the chronological steps in the stripping operation. Making reference to FIG. 4A, the coaxial cable 10, after having had a portion of the outer insulating layer stripped therefrom (the right-hand end thereof relative to FIGS. 4A-4C) is inserted through die 8 in the direction shown by arrow 12 and is advanced still further so that the insulating layer 3 enters into the opening 5a in punch 5 and the knitted shield layer 2 surrounds the outer surface of punch 5. Insertion is completed when the right-hand end of layer 3 abuts against the left-hand end of probe 6a which has previously been set to establish the amount of knitted shield layer 2 to be removed. Thus, a portion of the left-hand end of punch 5 is embraced between insulating layer 3 which lies in its interior and knitted shield layer 2 which surrounds its exterior.

The main shaft 4 is then linearly moved in the direction shown by arrow 13 in FIG. 4B until the pointed end of punch 5 reaches die 8 and begins to advance into the constant diameter hole portion 8a, at which time the knitted shield layer 2 is cut by the cooperating action between punch 5 and die 8 along the circumference perpendicular to the coaxial cable central axis, the cutting edges being the outer peripheral cutting edge of the punch's pointed end and the inner peripheral cutting edge of the die hole opening portion 8a.

FIG. 4C shows the state wherein the punch 5 has its left-hand end advanced to a small degree into the opening in die 8, resulting in the cutting of a portion of the knitted shield layer 2a from the coaxial cable. After cutting, the coaxial cable is withdrawn by being moved in the direction shown by arrow 14 whereby the cutaway knitted end portion 2a remains on the outer periphery of the left-hand end of punch 5. The cutting operation having been completed, the coaxial cable 10 may be fully withdrawn from die 8 preparatory to the next operation which may typically be removal of a portion of insulating layer 3 to expose a short length of the conductive core (not shown).

In putting the present invention into practice, it is necessary to press punch 5 against die 8 with the force sufficient to effect the cutting operation. In this connection any well know pressing means may be used. It should be obvious that, to obtain a cutting device having the desired performance, the necessary drive may be obtained through an electric motor with appropriate mechanical linkages to main shaft 4 by compressed air or other power sources, as well as a system in which a rack R is integrally joined to main shaft 4 and a meshing pinion gear G provided with a manually operable handle H may be employed to rotate the pinion gear and thereby linearly move main shaft 4 as a result of the meshing engagement therebetween.

Although the cutting operation was described in the foregoing embodiment as being effected through the movement of punch 5 while retaining die 8 stationary, it should be obvious that the punch 5 and main shaft 4 may be held stationary and die 8 may be moved toward punch 5 to perform the cutting operation with equal success. Alternatively, both punch 5 and die 8 may be substantially simultaneously moved in reciprocating fashion to perform the cutting and removing operation.

The cutting device of the present invention is of the type in which the cutting of the knitted shield layer and the like is effected through the shearing action of punch 5 and die 8. To produce such an accurate and effective shearing effect, a modification of the preferred embodiment, as is shown in FIG. 5 may be employed in which die 8 is provided with a tapered mouth portion having a tapered face 12 which comes into engagement with punch 11 which is provided with an edge of a pointed end. Alternatively, the punch may be provided with a tapered pointed end having a tapered face which comes into engagement with the die which is provided with an edge of a mouth portion thereof.

Cutting efficiency may be further enhanced by providing relative rotational movement between punch 5 and die 8. For example, main shaft 4 and punch 5 may be rotated while die 8 is held stationary, die 8 may be rotated while punch 5 is held stationary, or both punch 5 and die 8 may be simultaneously rotated in opposing directions.

As will be apparent from the foregoing description, the cutting device of the present invention is effective for use in cutting the shield knitted layer of a coaxial cord. However, the present invention is also widely applicable to cables of the concentric multilayer type other than coaxial cable and may be used to cut outer layers of any type or construction as the occasion demands, without departing from the spirit and scope of the present invention. Therefore, this invention is to be limited, not by the specific disclosure herein, but only by the appending claims.

We claim:

1. A cutting device for stripping a desired length of an outer flexible sheath of a concentric multi-layer rod-like structure such as a coaxial cable comprising:

a die having an opening of a diameter which substantially corresponds to the outer diameter of said sheath, one end of said opening being an entry end and the other end of said opening being a stripping end, said die opening being provided with a constant diameter portion contiguous to the end surface of said die surrounding the stripping end and being adapted to receive the free end portion of the multi-layer cable inserted into said entry end whereby a portion of the multilayer cable axially slidably projects beyond the end surface adjacent said stripping end;

a thin hollow cylindrical straight punch member having an inner diameter corresponding substantially to the inner diameter of said sheath and having an outer diameter fitting said constant diameter portion of said die with a predetermined clearance, said punch member being adapted to be inserted inside said sheath whereby a substantial portion of said desired length of said sheath is supported by said punch member, the shell thickness of said punch member being constant and being of a small gauge to facilitate slipping of the sheath over the outer surface of the punch member; and means for holding said punch member and said die in concentrically aligned relationship and allowing relative linear movement between said punch and said die;

said relative movement bringing a cutting edge provided by the outer peripheral edge of the free end of said punch member into proximity of another cutting edge provided between said constant diameter portion and the surface of said die adjacent the stripping end of the opening in said die with said sheath interposed therebetween and then the end portion of said punch member within said constant diameter portion whereby said sheath is sheared along a line defined by said cutting edges of said die and punch brought into proximity.

2. The device of claim 1 further comprising: a shaft axially slidably inserted within the opening in said punch and having a first end for abutting the free end of a cable inserted into said punch member; and means coupled to the opposite end of said shaft for adjustably positioning said shaft within said punch member;

said punch member being adjusted to be positioned beneath the exposed concentric layer to be removed wherein the underlying concentric layer extends into the opening of said punch and abuts the end of said adjustable shaft to thereby control the length of the exposed concentric layer positioned about said punch member.

* * * * *